Oct. 27, 1931.   J. O. POLLACK   1,829,536
CLUTCH AND BRAKE
Filed Nov. 24, 1930   3 Sheets-Sheet 1
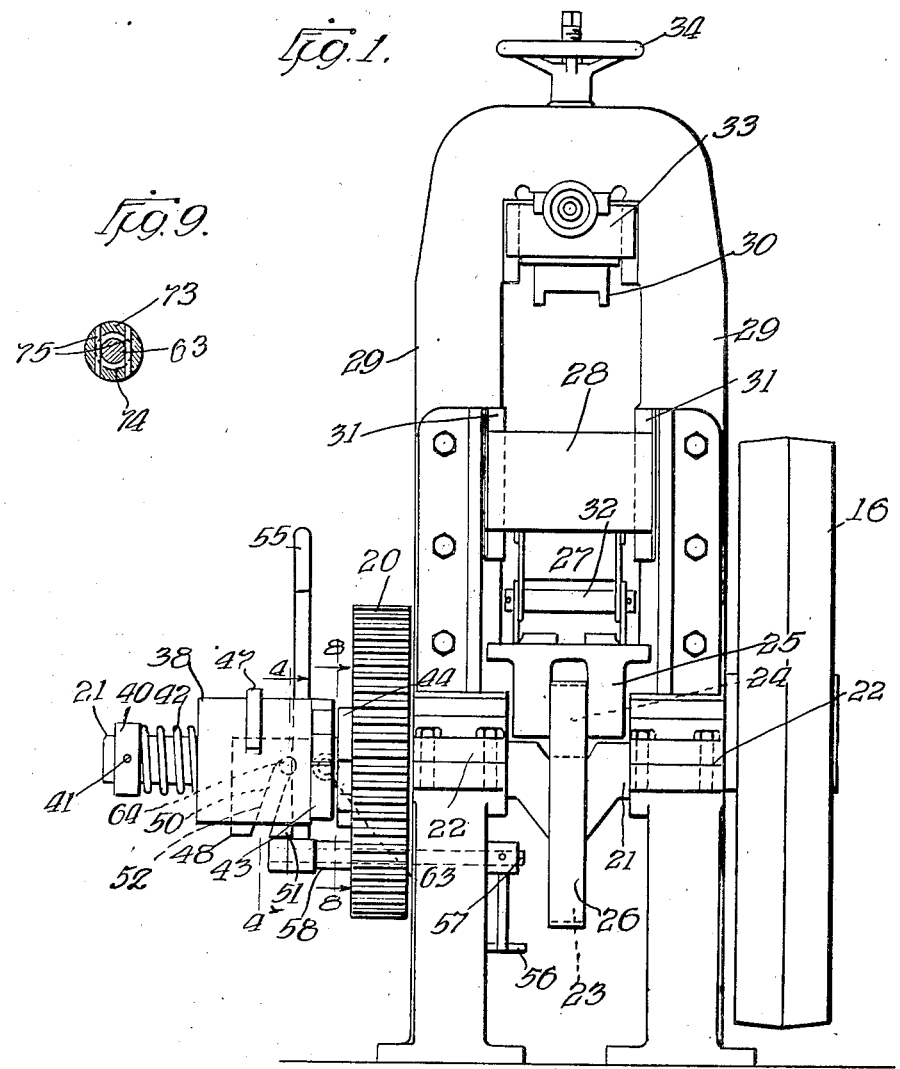

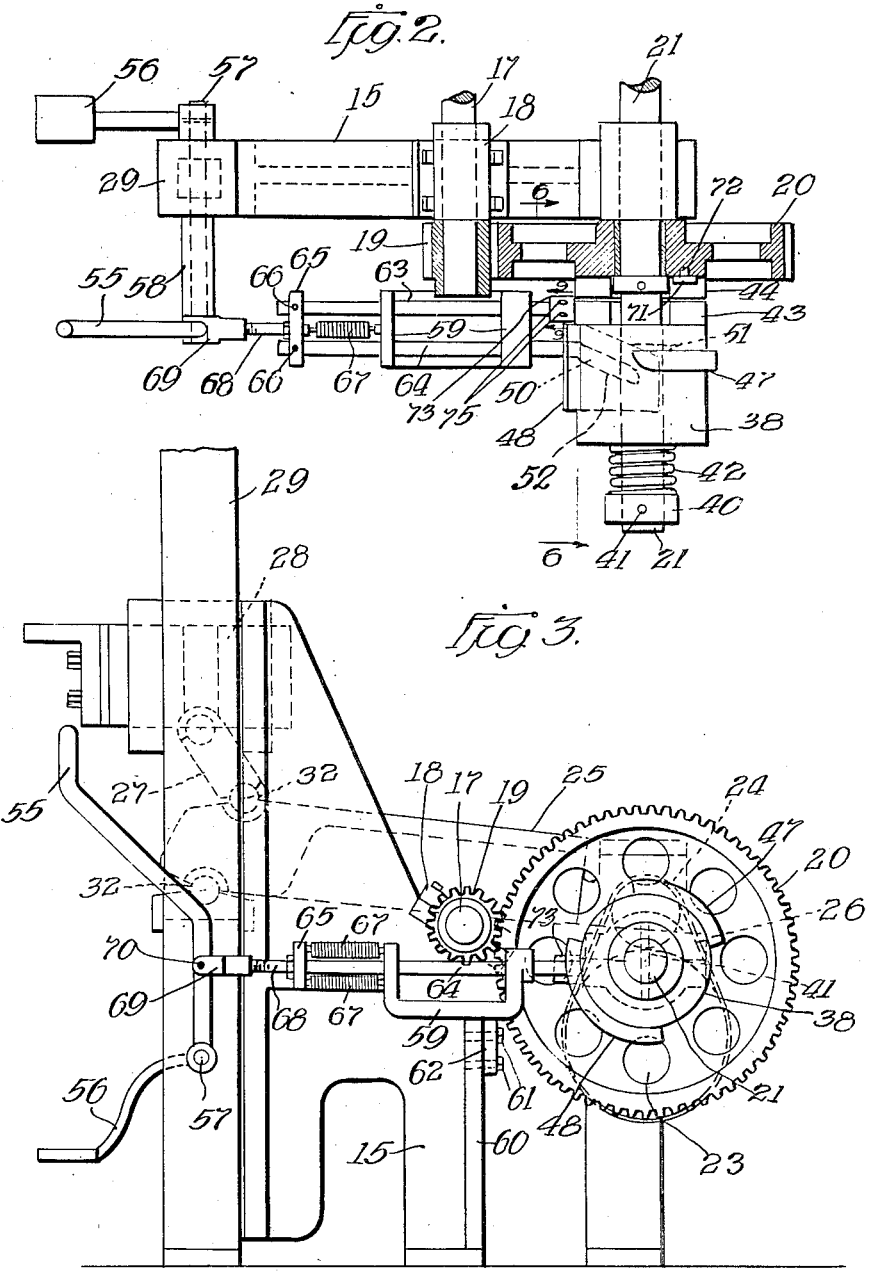

Oct. 27, 1931.  J. O. POLLACK  1,829,536
CLUTCH AND BRAKE
Filed Nov. 24, 1930  3 Sheets-Sheet 3
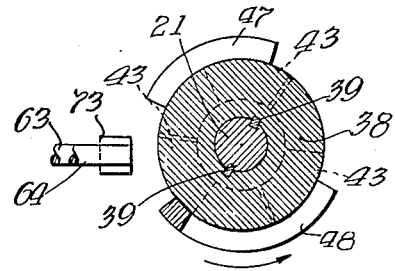
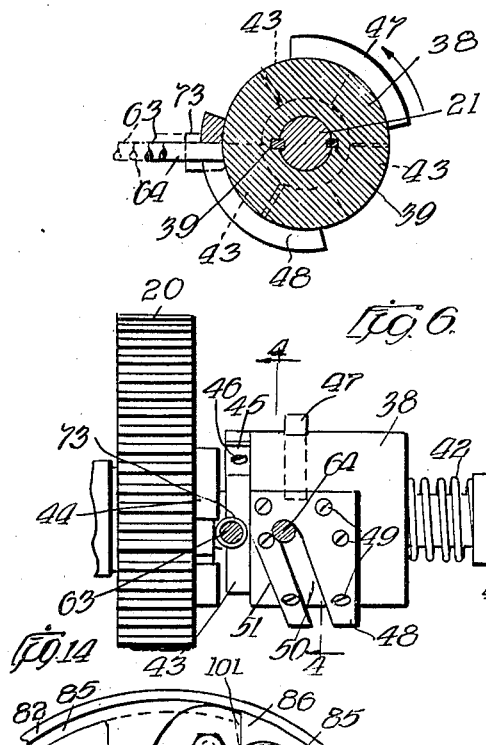
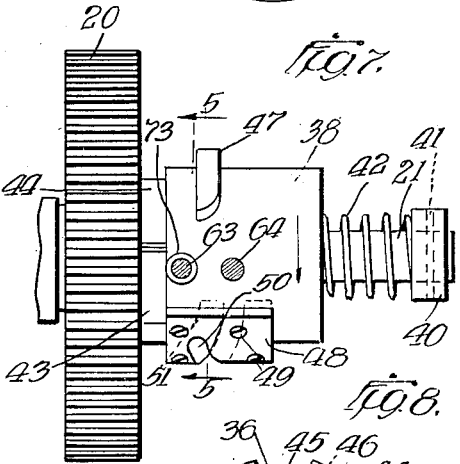
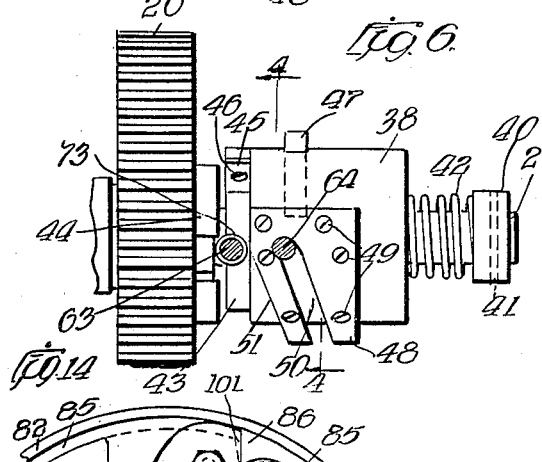
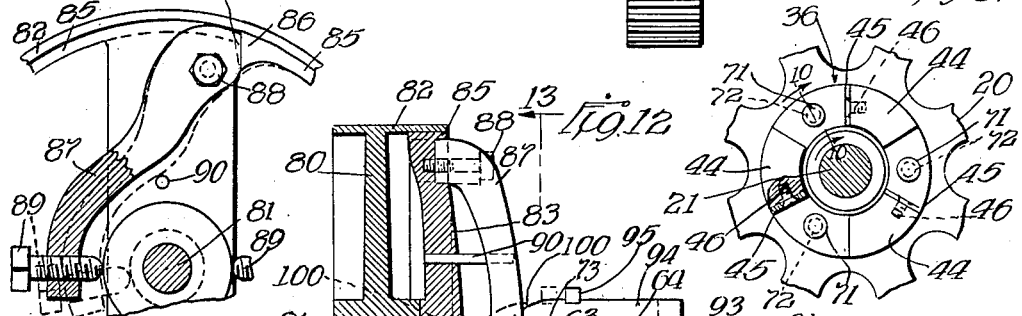
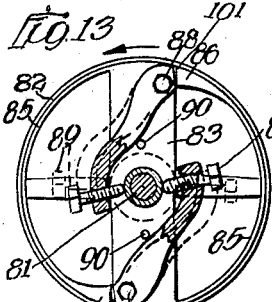
Inventor:
Joseph O. Pollack
By Hill, Hill
attys.
Witnesses:
Harry R. White Patented Oct. 27, 1931

1,829,536

UNITED STATES PATENT OFFICE

JOSEPH O. POLLACK, OF CHICAGO, ILLINOIS

CLUTCH AND BRAKE

Application filed November 24, 1930. Serial No. 497,710.

My invention relates to clutches and more particularly it relates to clutch mechanism operable to engage and to disengage driven or driving members. Still more particularly the invention relates to means operable to control either jaw or friction clutches whereby a normally non-rotating shaft is operatively engaged with a driving mechanism such for example as a rotating gear, sheave, or flywheel, and is disengaged from the driving mechanism and brought to a stop upon completion of a predetermined amount of rotation.

An object generally of the invention is to provide improved control mechanism for clutches comprising in combination means for shifting a clutch and means acting as a brake operating to retard and to bring the driven shaft to a halt at a predetermined point following release of the clutch from engagement with the driving mechanism.

Clutch devices of this character are generally equipped with a friction brake constantly operating to retard the shaft and thereby unnecessarily dissipates energy when the shaft is performing work. The invention provides means operable as a brake only upon the release of the clutch mechanism connecting the shaft with the driving member.

The invention has among its objects the provision of novel clutch release mechanism in combination with means for retarding the rotation of a driven shaft wherein said retarding means functions only when the shaft is disconnected from the driving member. Another object of the invention is the provision of clutch mechanism in combination with a spring operating to actuate the clutch mechanism to engage the shaft with the driving member, said spring also providing motivating force for retarding the shaft following its disengagement from the driving member.

The invention is embodied in a device which is adapted for connecting any driven shaft with a gear or fly-wheel driving mechanism and is particularly adapted for use with shafts which are rotated intermittently only, and when so rotated are subjected to high torque stresses in performing work for an instant. The invention finds one of its important applications in connection with shafts which actuate toggle arms or the like as described in my co-pending application, Serial No. 377,945, filed July 13, 1929, wherein the driven shaft is connected with a gear by means of a clutch and is caused to make one complete revolution and in so revolving actuates the toggle mechanism to produce extremely high pressures upon a die for a very short time interval. The inertia of the rotating shaft, following its sudden release from connection with the driving mechanism, tends to cause the shaft to continue its rotation, and another object of the invention is the provision of improved positively actuated means for releasing clutch mechanism to operatively connect a driving and a driven member, in combination with improved means for automatically disconnecting the driven member and applying a brake to retard and overcome the inertia of the rotating shaft sufficiently to bring it to a stop at a predetermined point.

Still another object of the invention is the provision of improved cushioning means for reducing the impact resulting from the sudden movement of a jaw clutch or the like, into operative engagement with a rotating or otherwise movable driving member.

A still further object is to produce a clutch mechanism of the class described which consists of a small number of relatively simple parts, the device being inexpensive to manufacture, rugged, and easy to operate.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

Referring now to the drawings, forming a part of this specification, wherein like reference characters indicate like or corresponding parts, Fig. 1 represents an end elevational view of a die press equipped with clutch mechanism embodying the principles of my invention;

Fig. 2 is a plan and sectional view of a portion of the device shown in Fig. 1;

Fig. 3 is a side elevation of a portion of the press shown in Fig. 1;

Fig. 4 is a sectional view along the line 4—4 of Fig. 1 showing the clutch mechanism drawn to a larger scale;

Fig. 5 is a view showing the clutch mechanism following its partial rotation from the position shown in Fig. 4;

Fig. 6 is a view along the line 6—6 of Fig. 2 drawn to a larger scale;

Fig. 7 is a view similar to Fig. 6 showing the clutch mechanism in operative position;

Fig. 8 is a view along the line 8—8 of Fig. 1 drawn to a larger scale;

Fig. 9 is a view along the line 9—9 of Fig. 2 drawn to a larger scale;

Fig. 10 is a view along the line 10—10 of Fig. 8 drawn to a larger scale;

Fig. 11 is a view similar to Fig. 10 showing the cushion of Fig. 10 in its flattened position following movement of the clutch mechanism to its operative position;

Fig. 12 is a view of an alternative embodiment of the invention adapted for control of a friction clutch mounted upon a fly-wheel or sheave;

Fig. 13 is a view along the line 13—13 of Fig. 12 drawn to a smaller scale; and

Fig. 14 is a view of a fragmentary portion of the structure shown in Fig. 13 drawn to a larger scale.

Referring now more particularly to the drawings, the mechanism embodying my invention is shown as mounted upon a supporting frame generally designated by the numeral 15. A fly-wheel 16 is fixedly mounted upon and rotates a shaft 17 carried by the frame 15 in bearings 18. A pinion 19 is mounted on the end of the shaft 17 opposite to the fly-wheel 16 where it meshes with a gear 20. The gear 20 normally rotates about a crank shaft 21 as an idler, and is brought into operative engagement with the crank shaft by means of clutch mechanism hereinafter more particularly described.

The crank shaft 21 carries an eccentric cam disk 23 which operatively engages a roller 24 mounted in a bifurcated end of a toggle arm 25. The disk 23 and the roller 24 are preferably held in cooperating relation by a metal strap or similar device 26. The toggle arm 25 cooperates with a toggle arm 27 by means of a pin 32 in controlling a head 28, vertically movable between a pair of upstanding members 29. The members 29 comprise a portion of the supporting frame 15 near the upper end of which a stationary die 30 is mounted. The stationary die 30 is adjusted vertically by means, generally designated by the numeral 34, and the amount of pressure to which the die is subjected is controlled by wedging means generally designated by the numeral 33, as more particularly described in my above designated copending application.

One complete revolution of the crank shaft 21 actuates the toggle arms 25 and 27 to move the head 28 to its extreme upper position and back to its starting point. Members forming ways 31 are suitably mounted on the inner edges of the vertical members 29 to prevent lateral movement of the head 28. The movable head 28 provides a mounting for a die (not shown) upon which an article to be embossed is positioned and is brought into contact with the stationary die under a high pressure for a short time interval while the head is at its extreme upper position. The rotation of the crank shaft 21 through one-half a revolution elevates the head 28 and produces the pressure required to emboss the work and upon completion of one revolution of the shaft the toggle arms 25 and 27 are retracted thereby releasing the head 28, and the movable die and the metal work carried thereby. The work to be performed is such that it is desirable that the rotation of the shaft 21 be limited to a single revolution and that the shaft be brought to a standstill approximately at its starting point.

It is found in practice that pressures as high as two hundred fifty tons are frequently imposed upon the work in embossing metal plates and since this pressure is exerted by the crank shaft 21 through the toggle arms 25 and 27, and it is obvious that the crank shaft is subjected for a short interval during its rotation to extremely high torque stresses. The inertia of the crank shaft 21 tends to cause its continued rotation for a substantial period following its disconnection from the driving gear 20 during the latter half of its rotation.

It is desirable that the crank shaft 21 be brought to a halt upon one complete revolution at substantially its starting point in order that the work may be easily removed from the press and new work inserted. For this purpose novel manually actuated clutch control and locking mechanism is mounted on the frame 15 in cooperation with a clutch member 38 slidably mounted on a projecting end of the crank shaft 21. The clutch member 38 is substantially cylindrical and has a plurality of teeth 43 on its inner end which cooperatively engage with corresponding teeth 44 formed on a hub 36 of the gear wheel 20 to form a jaw clutch. A spiral spring 42 is mounted on the crank shaft 21 with one end engaging a collar 40 and the other end bearing against the clutch member 38. The collar 40 is fastened on the shaft 21 by a pin 41 and the spring 42 constantly tends to move and hold the clutch member 38 in operative engagement with the gear wheel 20. Keys 39 cause the shaft 21 to rotate with the member 38 and also permit the member to be slid along the shaft into and out of operative engagement with the rotating gear 20.

A curved plate 48 is mounted upon the clutch member 38 and is fastened in position by a plurality of screws 49. The clutch control mechanism normally cooperates with the plate 48 to hold the clutch member 38 out of operative engagement with the gear wheel 20. For this purpose the plate 48 is provided with a groove or slot 50 starting at the forward edge of the plate and extending a substantial distance inwardly.

The slot 50 is bounded by a spiralled edge 52 on the side adjacent the outer end of the clutch member 38. The edge 52 may be given any desired angle of inclination and it is found in practice that an angle of twelve to fifteen degrees for the main portion of the slot gives satisfactory results. At its inner end the slot 50 is given a greater angle of inclination for a purpose hereinafter more particularly described. The end of the plate 48 adjacent the gear wheel 20 is cut away to form a beveled edge 51 substantially parallel with the outer spiralled bounding edge 52 of the slot 50.

The clutch control and cam mechanism mounted on the frame 15 is normally in engagement with one or both of the spiralled edges 51 and 52 of the plate 48 in order to hold the clutch mechanism in its inoperative position. The control or cam mechanism is arranged to disengage the clutch mechanism from the gear wheel 20 and also to provide a brake which brings the shaft 21 to a standstill following one complete revolution. The control or cam mechanism also provides a lock, holding the clutch member 38 against rebound or release during the application of the rod by reason of rotation of the shaft 21.

The clutch control mechanism includes a rod 63 extending parallel with the rod 64. The rods 63 and 64 form cams respectively engaging the spiralled edges 51 and 52 of the plate 48. The rod 63 has a roller 73 mounted upon its end by means of pins 75 positioned in a groove 74 as best shown in Fig. 9. The forward ends of the rods 63 and 64 are in substantial alignment and the roller 73 engages the beveled edge 51 of the plate 48 simultaneously with the engagement of the rod 64 with the spiralled bounding wall 52 of the slot 50.

The rods 63 and 64 are simultaneously movable into engagement with the spiralled edges 51 and 52 and for this purpose are slidably mounted in the apertured ends of a U-shaped member 59. The member 59 has a downwardly extending portion 62 fastened to a laterally extending flange 60 by means of bolts 61. The rods 63 and 64 project rearwardly from the U shaped member 59 and the projecting end portions are held in spaced apart relation by a bar 65. The bar 65 is fixedly mounted on the rods 63 and 64 by means of pins 66. The springs 67 each have one end fastened to the U shaped member 59 and the other end fastened to the bar 65 and as a result the rods 63 and 64 are normally held with their forward ends in contact with the cylindrical clutch member 38 by the pull of the springs.

A treadle 56 and a handle bar 55 are both so mounted upon the frame 15 that either is operable to retract the rods 63 and 64 to the position shown in Fig. 5 where they clear the spiralled edges of the clutch member 38. A pivot rod 57 provides a common rotatable mounting for the treadle 56 and the handle member 55. A rod 68 having a bifurcated end 69 connects the handle member 55 with the bar 65. The handle member 55 is positioned immediately to the rear of the rods 63 and 64 and is held in spaced apart relation to the frame 15 by a pipe separator or spacer 58 mounted on the pivot 57. The operator of the machine may retract the rods 63 and 64 sufficiently to release the clutch member 38, either by pulling the handle 55 or by pressing down upon the treadle 56 thereby overcoming the tension of the springs 67.

Following the release of the rods 63 and 64 from holding engagement with the clutch member 38, the spring 42 forces the clutch member into operative engagement with the gear wheel 20 thereby instantly starting rotation of the shaft 21. The pull upon the handle 55 or the pressure exerted upon the treadle 56 is applied for an instant only and the springs 67 immediately pull the rods back to a point where their ends contact with the clutch member 38. A segmental annular locking lug or band 47 is mounted on the side of the clutch member 38 opposite to the plate 48 in such a position that rotation of the clutch member in clockwise direction, as observed in Fig. 3, brings the lug or band 47 between the retracted rods 63 and 64 when the clutch member 38 is in full engagement with the gear wheel 20. The forward end of the lug or band 47 is tapered to insure its entrance between the rollers 73 and the rod 64. While the lug or band 47 is revolving between the rods 63 and 64, it and the rods together form a lock preventing rebound of the clutch member 38 or any sliding movement thereof during the time when the shaft 21 and the clutch mechanism are subjected to torque in exerting pressure upon the stationary die 30. Upon completion of slightly more than one-half of a revolution of the shaft 21 and the clutch member 38, the lug 47 is advanced to a point where it moves from between the rods 63 and 64. The forward open end of the slot 50 is so positioned that the continued revolution of the clutch member 38 causes the end of the rod 64 to enter the open end of the slot. The roller 73, which is mounted on the rod 63, engages the beveled edge 51 of the plate 48 simultaneously with the entrance of the rod 64 into the slot 50. Further rotation of the clutch member 38, with the roller 73 in contact with the beveled edge 51, forces the clutch member against the pressure of the spring 42 back to its initial position wherein it is out of engagement with the gear wheel 20.

The combined action of the two rods 63 and 64 arranged to simultaneously engage with the clutch member 38 in combination with the compression spring 42 produces results which are an important feature of the invention. The spring 42 performs the dual function of engaging the clutch mechanism with the driving wheel 20 and furnishing the energy for retarding the shaft 21 following release of the clutch mechanism from engagement with the gear wheel 20. The resistance offered by the compression spring 42 increases with the amount the spring is compressed. Since the compression of the spring 42 increases from the time the clutch member 38 is disengaged from the gear wheel 20 until the shaft 21 comes to a standstill with the rod 64 near the end of the slot 50, the increased resistance of the spring 42 to the sliding movement of the clutch member 38 accelerates the retarding effect resulting from the friction between the rod 64 and the spiralled edge 52. This brake action is further accelerated by the constantly diminishing momentum of the shaft 21.

The spacing of the rods 63 and 64 is such that the rod 64 is in constant contact with the spiralled edge 52 of the slot 50 when the roller 73 is in operative engagement with the spiralled edge 51. The contact of the roller 73 with the spiralled edge 51 forces the clutch member 38 back to its initial inoperative position with a minimum of frictional resistance. The spacing of the rods 63 and 64, the diameter of the roller 73 and also the spacing of the spiralled parallel edges 51 and 52 are so arranged that the rod 64 offers substantial frictional resistance to rotation of the clutch member 38. The sliding bearing of the rod 64 in contact with the spiralled edge 52 produces sufficient friction to rapidly retard the rotation of the clutch member 38 and the shaft 21.

The inclination of the spiralled edges 51 and 52 and the arrangement of the rods 63 and 64 and the roller 73 are so adjusted as to bring the shaft 21 and the clutch member 38 to a halt upon the completion of one revolution. The increased angle of inclination of the slot 50 at its inner end tends to accelerate the resistance offered to the rotation of the clutch member 38 as the shaft 21 and the clutch member approach completion of one revolution and is so designed as to cause the shaft to stop at its initial starting point without any jar or impact. It is obvious that the manually controlled rods 63 and 64 provide cams cooperating with the plate 48 and are positively actuated to release the clutch member 38 thereby permitting the clutch member to operatively engage with the driving gear 20 and that upon release of the rods 63 and 64 from manual control they automatically return to a position wherein they act as cams forcing the clutch mechanism out of engagement with the gear wheel 20 and as a result, the shaft 21 is brought to a standstill at a predetermined point.

A plurality of bearing plates 45 are mounted one on each of the contacting sides of the teeth 43 and 44 and are fastened in position by screws 46. It is desirable that the clutch member 38 be moved rapidly into operative engagement with the gear wheel 20 upon its release following the retraction of the rods 63 and 64, and for this purpose the spring 42 is so constructed as to exert strong pressure upon the clutch member 38. The rapid movement of the clutch member 38 into operative engagement with the corresponding clutch portion of the hub 36 of the driving gear wheel 20 causes the member 38 to strike the hub with considerable force. The shock of such impact is softened or substantially eliminated by mounting rubber cushions 71 in each of the spaces between the teeth 44. The cushions 71 have a small diametered portion 72 extending into and closely fitting apertures provided in the hub 36 for that purpose. The normal position of the cushions 71 is shown in Fig. 10 with the teeth 43 clearing the cushions when the clutch member 38 is disconnected. Upon movement of the clutch member into operative position, the cushion 71 is flattened and takes the general shape shown in Fig. 11. It is found in practice that the cushions 71 satisfactorily prevent or minimize the noises that otherwise result from the rapid movement of the clutch member 38 into its operative position. The device provides effective means operatively connecting a shaft with a rapidly revolving driving member for a period of time sufficient to start the shaft and bring it to a standstill at the end of one complete rotation with a minimum of noise and shock.

The control and brake mechanisms described in connection with the device as shown in Figs. 1 to 11, inclusive, are also adapted for use with a friction clutch mounted upon a fly wheel or a sheave 82 as illustrated in Figs. 12 to 14, inclusive. The fly wheel 82 is rotatably mounted upon a shaft 81 and the friction clutch is fixedly mounted upon the shaft by means of a pin 84. The friction clutch comprises a diametrical bar 83, the opposite ends of which each form the terminus and a fixed mounting for one end of a pair of resilient clutch bands 85. The opposite ends of the clutch bands 85 have an enlarged expanded portion 86 with which one end of a pair of pivotally mounted arms 87 are moved into operative engagement following the release of a clutch mechanism and control device embodying the principles of my invention.

The clutch control mechanism comprises a cylindrical member 94 slidably mounted upon and rotatable with the shaft 81. A collar 91, fixedly mounted on the outer end of the shaft 81 by means of a pin 92, provides an abutment for one end of a compression spring 93. The other end of the spring 93 presses against the member 94. The inoperative position of the member 94 is shown in full lines and its operative position is shown in dotted lines in Fig. 12. The member 94 is normally held locked in its inoperative position by rods 63 and 64. The rods are mounted and manipulated in the same manner as in the embodiment already described.

The arms 87 are pivotally mounted on bolts 88 and normally occupy their full line position of Fig. 13 and their dotted line position of Fig. 14 when the clutch member 94 is in its inoperative position. A screw bolt 89 is adjustably mounted in the free end of each arm 87 with their ends in contact with a tapered end surface 100 of the control member 94. The control member 94 is so positioned on the shaft 81 that the arms 87 and the screw bolts 89 take the full line position of Fig. 13 and the dotted line position of Fig. 14 when the member 94 is in its full line position of Fig. 12. A pair of pins 90 are positioned to form stops limiting the movement of the free ends of the arms 87 toward the member 94. The outer ends of the arms 87 have an end portion 101 so positioned as to clear the adjacent expanded end portion 86 of the bands 85 when the free ends of the arms occupy the full line position of Fig. 13. The end portions 101 are caused to move into operative engagement with the adjacent end portion 86 of the bars 85 by rotating the free end of the arms away from the shaft 81 about the bolts 88 as pivots.

Upon release of the member 94 by retraction of the rods 63 and 64, the spring 93 slides the member from its full line position to its dotted line position of Fig. 12. The movement of the member 94 to its dotted line position causes its curved tapered end surface 100 to spread the bolts 89 and rotate the arms 87 outwardly. The resulting outward rotation of the arms 87 brings the portion 101 of the arms into operative engagement with the expanded portion 86 of the bands 85 thereby forcing the bands into contact with the inner surface of the rim 82 so that the friction between the band and the rim causes the fly wheel and the shaft 81 to rotate together.

Thus it will be seen that I have provided a combination control and brake device suitable for use with either jaw or friction clutches and operable to connect a driven shaft with a driving member to accomplish one complete revolution of the shaft and to insure the stopping of the shaft following one complete revolution under high torque pressure.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A shaft, a driving member, a clutch member slidably mounted upon the shaft and movable to operatively connect and disconnect the shaft and driving member, spring means yieldingly holding the clutch member in operative engagement with the driving member, one side of the clutch member providing two parallel spiralled edge faces, a pair of cam members movable to respectively cooperate with said spiralled edges, means operable to move said cam members into and out of the path of the spiralled faces, one of said cam members having rolling contact with its cooperating spiralled edge face and the other of said cam members having sliding contact with its cooperating edge face when said cam members are moved into the path of said faces.

2. A shaft, a driving member, a clutch member slidably mounted upon the shaft and movable to operatively connect and disconnect the shaft and driving member, spring means yieldingly holding the clutch member in operative engagement with the driving member, one side of the clutch member providing two parallel spiralled edge faces, a pair of cam members movable to respectively cooperate with said spiralled edges, one of said cam members having rolling contact with its cooperating spiralled edge face and the other of said cam members having sliding contact with its cooperating edge face thereby to disengage the clutch member and to form a brake effective to stop rotation of the shaft.

3. A shaft, a driving member operable to rotate the shaft, a clutch member slidably mounted upon the shaft and movable to operatively connect and disconnect the shaft and driving member, spring means yieldingly holding the clutch member in operative engagement with the driving member, a plate partially enclosing the clutch member providing two parallel edge faces spiralled relative to the shaft, a pair of spaced cam members movable to respectively cooperate with said spiralled edges, one of said cam members having rolling contact with its cooperating spiralled edge face and the other of said cam members having sliding contact with its cooperating edge face.

4. A shaft, a driving member operable to rotate the shaft, a clutch member slidably mounted upon the shaft and movable to operatively connect and disconnect the shaft and driving member, spring means yieldingly holding the clutch member in operative engagement with the driving member, one side of the clutch member providing two parallel edge faces spiralled relative to the shaft, a pair of spaced cam members movable to respectively cooperate with said spiralled edges, one of said cam members having rolling contact with its cooperating spiralled edge face to slide said clutch member along said shaft to disengage it from the driving member and the other of said cam members having sliding contact with its cooperating edge face thereby forming a brake effective to stop rotation of the shaft at a predetermined point following release of the clutch member and means manually operable to disengage said cam members from said spiralled edges.

5. A shaft, a driving member, a clutch member slidably mounted upon the shaft and movable to operatively connect and disconnect the shaft and driving member, spring means yieldingly holding the clutch member in operative engagement with the driving member, one side of the clutch member providing two parallel spiralled edge faces, a pair of cam members movable to respectively cooperate with said spiralled edges, manually operable control means for the cam members, one of said cam members having rolling contact and the other of said cam members having sliding contact with its cooperating edge face following release of the clutch member, a segmental annular band so positioned on the clutch member opposite to said spiralled faces as to be revolvable between said cam members when the clutch member is in operative engagement with the driving member.

6. A shaft, a driving member, a clutch member slidably mounted upon the shaft and movable to operatively connect and disconnect the shaft and driving member, spring means yieldingly holding the clutch member in operative engagement with the driving member, one side of the clutch member providing two parallel spiralled edge faces, a pair of spaced cam members movable to respectively cooperate with said spiralled edges, manually operable control means for releasing the cam members from engagement with the spiralled edge faces, one of said cam members having rolling contact with its cooperating spiralled edge face to slide said clutch member along said shaft to disengage it from the driving member and the other of said cam members having sliding contact with its cooperating edge face forming a brake effective to stop rotation of the shaft at a predetermined point following release of the clutch member, a segmental annular band so positioned on the clutch member opposite to said spiralled faces as to be revolvable between said cam members when the clutch member has moved into operative engagement with the driving member and following release of the cam members from engagement with said spiralled edges.

7. A shaft, a driving member, a clutch member slidably mounted upon the shaft and movable to operatively connect and disconnect the shaft and driving member, spring means yieldingly holding the clutch member in operative engagement with the driving member, a plate mounted on one side of the clutch member providing two parallel edge faces spiralled relative to the shaft, a pair of cam members movable to respectively cooperate with said spiralled edges, means operable to move said cam members into and out of the path of the spiralled faces, one of said cam members having rolling contact with its cooperating spiralled edge face and the other of said cam members having sliding contact with its cooperating edge face, a segmental annular band so positioned on the clutch member opposite to said plate as to be revolvable between said cam members when the clutch member has moved into operative engagement with the driving member following release of the cam members from engagement with said spiralled edges, said band thereby locking the clutch member in operative position.

8. A shaft, a driving member, a clutch member slidably mounted upon the shaft and movable to operatively connect and disconnect the shaft and driving member, spring means yieldingly holding the clutch member in operative engagement with the driving member, a plate mounted on one side of the clutch member providing two parallel edge faces spiralled relative to the shaft, a pair of cam members movable to respectively cooperate with said spiralled edges, means operable to move said cam members into and out of the path of the spiralled faces, one of said cam members having rolling contact with its cooperating spiralled edge face to slide said clutch member along said shaft to disengage it from the driving member and the other of said cam members having sliding contact with its cooperating edge face thereby forming a brake effective to stop rotation of the shaft at a predetermined point following release of the clutch member from engagement with the driving member, a segmental annular band so positioned on the clutch member opposite to said plate as to be revolvable between said cam members when the clutch member has moved into operative engagement with the driving member following release of the cam members from engagement with said spiralled edges, said band thereby locking the clutch member in operative position.

9. A shaft, a driving member operable to rotate the shaft, a cylindrical clutch member slidably mounted on said shaft to operatively connect and disconnect the shaft and driving member, spring means yieldingly holding the clutch member in operative engagement with the driving member, a plate having two parallel spiralled edge faces mounted on one side of said clutch member, a pair of parallel rods respectively movable into the path of revolution of said spiralled faces, the spacing of said rods being such that they simultaneously act as cams upon the adjacent spiralled faces to slidingly move said clutch member to inoperative position and to stop rotation of the clutch member at a predetermined point.

10. A shaft, a driving member operable to rotate the shaft, a cylindrical clutch member slidably mounted on said shaft to operatively connect and disconnect the shaft and driving members, spring means yieldingly holding the clutch member in operative engagement with the driving member, a plate having two parallel spiralled edge faces mounted on one side of said clutch member, a pair of parallel rods respectively movable into the path of revolution of said spiralled faces, one of said rods having sliding cam contact and the other having a roller in contact with the adjacent spiralled face.

11. A shaft, a driving member operable to rotate the shaft, a cylindrical clutch member slidably mounted on said shaft to operatively connect and disconnect the shaft and driving member, spring means yieldingly holding the clutch member in operative engagement with the driving member, a plate having two parallel spiralled edge faces mounted on one side of said clutch member, a pair of parallel rods respectively movable into the path of revolution of said spiralled faces, one of said rods having a roller in contact with its adjacent spiralled face and thereby moving the clutch member to disengage the driving member and the other of said rods having sliding contact with its adjacent spiralled face thereby providing a brake operating to stop rotation of the clutch member and shaft at a predetermined point.

12. A shaft, a driving member operable to rotate the shaft, a cylindrical clutch member concentric with and slidably mounted on said shaft to operatively connect and disconnect the shaft and driving member, spring means yieldingly holding the clutch member in operative engagement with the driving member, a curved plate mounted on one side of said clutch member, said plate having two parallel spiralled edge faces, a pair of parallel rods respectively movable into the path of revolution of said spiralled faces, one of said rods having a roller in cam contact with its adjacent spiralled face and thereby moving the clutch member to disengage the driving member and the other of said rods having sliding contact with its adjacent spiralled face thereby providing a brake operating to stop rotation of the clutch member and shaft at a predetermined point.

13. A shaft, a driving member operable to rotate the shaft, a cylindrical clutch member concentric with and slidably mounted on said shaft to operatively connect and disconnect the shaft and driving member, spring means yieldingly holding the clutch member in operative engagement with the driving member, said clutch member having an irregular shaped projecting portion on one side wall bounded by a surface concentric with the clutch member, said projecting portion having a pair of parallel spiralled edge faces, a pair of longitudinally movable parallel rods, means operable to simultaneously move said rods each into the path of revolution of one of said spiralled faces, one of said rods having a roller in contact with one of said spiralled edge faces and operating thereby to slide the clutch member along the shaft into inoperative position and the other of said rods having sliding frictional contact with the other of said spiralled edge faces and operating thereby as a brake to stop the clutch member and shaft at a predetermined point following release of the clutch member.

14. A shaft, a driving member operable to rotate the shaft, a cylindrical clutch member concentric with and slidably mounted on said shaft to operatively connect and disconnect the shaft and driving member, spring means yieldingly holding the clutch member in operative engagement with the driving member, said clutch member having an irregular shaped projecting portion on one side wall bounded by a surface concentric with the clutch member, said projecting portion having a pair of parallel spiralled edge faces, a pair of longitudinally movable rods, means operable to simultaneously move said rods into the paths of revolution of said spiralled faces, one of said rods having a roller in contact with one of said revolving spiralled edge faces and the other of said rods having sliding contact with the other of said spiralled edge faces.

15. A shaft, a driving member operable to rotate the shaft, a cylindrical clutch member concentric with and slidably mounted on said shaft to operatively connect and disconnect the shaft and driving member, spring means yieldingly holding the clutch member in operative engagement with the driving member, said clutch member having an irregular shaped projecting portion on one side wall bounded by a surface concentric with the clutch member, said projecting portion having a pair of parallel spiralled edge faces, a pair of longitudinally movable rods, means operable to simultaneously move said rods each into the path of revolution of one of said spiralled faces, said rods when in the path of said spiralled faces operable as cams cooperating to move said clutch member to inoperative position and to stop rotation of the clutch member and shaft at a predetermined point.

16. Clutch mechanism comprising a driving member and a driven member, said members each having a plurality of teeth, means operable to move said members into and out of operative engagement and a plurality of resilient members positioned between the teeth of one of said members to form cushions with which the projecting teeth of the other of said members contact when said members are brought into operative engagement.

17. A shaft, a driving member, a clutch member slidably mounted on the shaft, a compression spring acting to move the clutch member to operatively connect the shaft with the driving member, a cam member operable to move said clutch member towards the compression spring, means operable to move said cam member into the path of said clutch member to disconnect said shaft and driving member, said cam member having sliding engagement with the clutch member to move the clutch member against the resistance of said spring to inoperative position and to continue said movement to provide a brake tending to stop the rotation of the shaft at a predetermined point.

18. A shaft, a driving member operable to rotate the shaft, a cylindrical clutch member slidably mounted on said shaft to operatively connect and disconnect the shaft and driving member, a compression spring yieldingly holding the clutch member in operative engagement with the driving member, a plate having two parallel spiralled edge faces mounted on one side of said clutch member, a pair of parallel rods respectively movable into the path of revolution of said spiralled faces, one of said rods having a roller in contact with its adjacent spiralled face and thereby moving the clutch member to disengage the driving member and the other of said rods having sliding contact with its adjacent spiralled face following release of said clutch member and operating thereby to further compress said spring and to act as a brake, the compression of said spring tending to increase the frictional resistance between said sliding cam and its cooperating spiralled face thereby accelerating the braking effect of said spiralled cam upon the rotation of the shaft.

In witness whereof, I hereunto subscribe my name this 5th day of November A. D., 1930.

JOSEPH O. POLLACK.